US010674852B2

(12) United States Patent
Gauss et al.

(10) Patent No.: US 10,674,852 B2
(45) Date of Patent: Jun. 9, 2020

(54) COLLAPSIBLE VESSEL WITH HEATSINK

(71) Applicant: GSI Outdoors, Inc., Spokane, WA (US)

(72) Inventors: Kurt Gauss, Spokane, WA (US); Steven Richard Motzkus, Spokane, WA (US)

(73) Assignee: GSI Outdoors, Inc., Spokane, WA (US)

( * ) Notice: Subject to any disclaimer, the term of this patent is extended or adjusted under 35 U.S.C. 154(b) by 335 days.

(21) Appl. No.: 15/877,842

(22) Filed: Jan. 23, 2018

(65) Prior Publication Data

US 2019/0223645 A1 Jul. 25, 2019

(51) Int. Cl.
| A47J 27/00 | (2006.01) |
| F28F 3/02 | (2006.01) |
| A47J 33/00 | (2006.01) |
| A47J 36/08 | (2006.01) |
| A47J 36/04 | (2006.01) |
| A47J 37/07 | (2006.01) |

(52) U.S. Cl.
CPC ............. *A47J 27/002* (2013.01); *A47J 33/00* (2013.01); *A47J 36/04* (2013.01); *A47J 36/08* (2013.01); *F28F 3/025* (2013.01); *A47J 2037/0777* (2013.01)

(58) Field of Classification Search
CPC .................. A47J 27/002; A47J 33/00
See application file for complete search history.

(56) References Cited

U.S. PATENT DOCUMENTS

| 7,678,271 | B2 | 3/2010 | Curtin | |
| 9,572,449 | B2 | 2/2017 | Livesey | |
| 2007/0193575 | A1* | 8/2007 | Jan | A47J 27/002 |
| | | | | 126/390.1 |
| 2008/0099476 | A1* | 5/2008 | Fung | A47J 36/02 |
| | | | | 220/6 |
| 2008/0164264 | A1* | 7/2008 | Fung | A47J 27/002 |
| | | | | 220/573.1 |
| 2010/0242282 | A1* | 9/2010 | Huang | A47J 27/022 |
| | | | | 29/890.03 |

* cited by examiner

*Primary Examiner* — Jason L Vaughan
*Assistant Examiner* — Amanda Kreiling
(74) *Attorney, Agent, or Firm* — Randall Danskin P.S.

(57) ABSTRACT

An axially collapsible cooking vessel comprises a flexible body having plural circumferentially extending reduced thickness areas spacedly arrayed between an upper peripheral edge and a bottom edge that provide for nested folding of the flexible body axially inwardly and downwardly upon itself; a heat conductive base that is interconnected with a bottom peripheral edge of the flexible body in a fluid tight engagement therewith; a heatsink structurally interconnected to a bottom surface of the heat conductive base, the heatsink having an annular shaped radiator and a circumferentially extending shield extending about the annular shaped radiator; and a removable lid releasable engageable with a top opening defined by the flexible body.

14 Claims, 7 Drawing Sheets

COLLAPSIBLE VESSEL WITH HEATSINK

TECHNICAL FIELD

This invention relates to cookware, and more particularly to cookware for use in outdoor activities such as camping and more particularly, collapsible cookware with an integral heatsink, cookware that is lightweight, easily transportable and easily storable.

BACKGROUND OF THE INVENTION

Cookware such as pots, and kettles that are used for cooking food products are typically formed of metal and have a predetermined fixed size/volume. Although cookware comes in many different sizes, shapes and configurations, all cookware includes two basic elements: a first surface for receiving thermal energy from a heat source (the heating receiving surface), and a second surface for applying the received heat to food to be cooked (the cooking surface). Generally, the heat receiving surface and the cooking surface are the opposing faces of a single element, and further, that single two sided element is typically formed of metal.

Heat capacity is the ratio of the amount of energy absorbed by a material compared to the associated temperature rise of the material (that is, energy input/temperature rise). Materials having a low heat capacity are desirable for cookware because a small amount of input energy yields a larger associated temperature rise. Specific heat is the heat capacity of the material per unit of mass (energy input/(temperature)(mass). Materials having relatively low specific heats are desirable for cookware because they transfer heat efficiently. Because metals have low heat capacity and low specific heat, metals are conventionally used for cookware. For example, iron has a specific heat of 0.444; aluminum has a specific heat of 0.900; and copper has a specific heat of 0.385. The very low specific heat of copper thus makes it desirable as a cookware material. A drawback, of course is that metals are heavy. Thus while cast-iron skillets and "Dutch ovens" are well known for their desirable cooking characteristics, cast-iron cookware is very, very heavy. Aluminum gives the benefit of lighter weight, but lower thermal efficiency. One way to increase the efficiency of a cooking vessel is to increase the surface area of the vessel that is exposed to the heat source—which results in more heat transfer.

A fixed size/volume for a cooking vessel is typically not a hindrance when cooking vessels are used in an established kitchen and are stored in close proximity to the location of use. However, as outdoor activities, such as camping, use of recreational vehicles, and backpacking has become more and more popular, and that outdoor enthusiast population is more accustomed to cooking and eating higher-quality meals, the need for storage of, and packing along, or otherwise carrying cooking vessel's has increased.

In backpacking and similar outdoor activities, carrying a plurality of fixed size/volume cooking vessels is impractical, and may be impossible, because space and weight are critical items of importance. Because known cooking vessel's, which are typically formed of metal, are both heavy, and space consuming, outdoor enthusiasts and backpacking enthusiasts have been forced to choose between packing minimal cooking vessel's, or forced to use inadequate cooking vessels.

Therefore, there is a need for a cooking vessel which resolves at least some of the previously described drawbacks and provides a cooking vessel that is efficient for cooking, is lightweight, easily transportable, easily storable and does not require significant amounts of space. Further, there is a need for cooking vessels which allow plural cooking vessels to be packed along with minimal weight and minimal space requirements. Thus, there remains a long felt an unmet need for cookware that is both thermally efficient and easy to store and easy to transport and is lightweight.

SUMMARY OF THE INVENTION

A first aspect of the current invention is a collapsible cooking vessel having a flexible body with an outer circumferentially extending surface, an opposing inner circumferentially extending surface, an upper peripheral edge defining an upper diameter, an opposing and spaced apart bottom edge defining a bottom diameter, and at least one circumferentially extending reduced thickness areas in the flexible body between the upper peripheral edge and the bottom edge; a heat conductive base having a generally planar top surface, an opposing generally planar bottom surface and an upwardly extending circumferential lip extending entirely about a circumference of the heat conductive base and wherein the upwardly extending lip has an outer circumferential surface and an upper peripheral edge that is interconnected with the bottom peripheral edge of the flexible body in a fluid tight engagement, and wherein the inner circumferentially extending surface of the flexible body and the generally planar top surface of the heat conductive base define an interior volume of the collapsible cooking vessel; a heatsink structurally interconnected to the generally planar bottom surface of the heat conductive base, the heatsink having an annular shaped radiator and a circumferentially extending shield, the annular shaped radiator having an upper edge portion in direct fractional contact with the bottom surface of the heat conductive base, an opposing bottom edge portion, an inner circumferential edge defining an interior diameter, and an outer circumferential edge portion defining an exterior diameter, and further having a plurality of regularly spaced bends and regularly spaced channels; and the circumferentially extending shield has a side-wall and a generally perpendicularly extending bottom, the side wall having an upper edge portion, a bottom edge portion, an outer surface, an inner surface and defines a plurality of spacedly arrayed heat releasing orifices communicating through the side wall spacedly arrayed between the upper edge portion and the bottom edge portion, and the upper edge portion of the side wall structurally communicates with the outer circumferential surface of the heat conductive base, and the perpendicularly extending bottom is adjacent the bottom edge portion of the side wall and extends radially inwardly therefrom in frictional contact with the bottom edge portion of the radiator, and defines a medial bottom orifice; and an annular ring extending circumferentially about the flexible body proximate the upper peripheral edge, the annular ring carrying a handle.

A further aspect of the current collapsible vessel with a heatsink comprises plural spacedly arrayed lid securing protuberances adjacent the upper peripheral edge and adjacent the outer circumferentially extending surface of the flexible body.

A further aspect of the current collapsible vessel with a heatsink comprises a removable lid having a top surface, a bottom surface, a circumferentially extending peripheral edge having a diameter that is substantially similar to the upper diameter of the flexible body; and a lid handle.

A further aspect of the current collapsible vessel with a heatsink comprises a plurality of drain holes and a vent hole defined in the removable lid, the plurality of drain holes and vent hole communicating between the top surface and the opposing bottom surface.

A further aspect of the current collapsible vessel with a heatsink comprises a latch carried by the releasable lid that releasable engages with the annular ring adjacent the upper peripheral edge of the flexible body.

A further aspect of the current collapsible vessel with a heatsink is wherein the flexible body has two spacedly arrayed circumferentially extending reduced thickness areas.

A further aspect of the current collapsible vessel with a heatsink is wherein the flexible body has plural spacedly arrayed circumferentially extending reduced thickness areas.

A further aspect of the current collapsible vessel with a heatsink is wherein the flexible body has one circumferentially extending reduced thickness area.

A further aspect of the current collapsible vessel with a heatsink is wherein the flexible body is axially collapsible by folding the spacedly arrayed circumferentially extending reduced thickness areas upon themselves to reduce the vertical height of the flexible body.

A further aspect of the current collapsible vessel with a heatsink is wherein the flexible body has a configuration of a truncated cone.

A further aspect of the current collapsible vessel with a heatsink is wherein the flexible body is formed of silicone.

A further aspect of the current collapsible vessel with a heatsink is wherein the flexible body is formed of a flexible polymer.

A further aspect of the current collapsible vessel with a heatsink is wherein the flexible body is formed of Thermal Plastic Urethane (TPU).

A still further aspect is a vertically collapsible cooking vessel comprising a flexible polymer body having an outer circumferentially extending surface, an opposing inner circumferentially extending surface, an upper peripheral edge defining an upper diameter, an opposing and spaced apart bottom edge defining a bottom diameter, and at least one circumferentially extending reduced thickness area in the flexible body spacedly arrayed between the upper peripheral edge and the bottom edge; a heat conductive base having a generally planar top inner surface, an opposing generally planar bottom outer surface, an outer circumferential surface, and a circumferential upwardly extending the lip extending entirely about a circumference of the heat conductive base and wherein the circumferential upwardly extending lip has an upper peripheral edge that is interconnected with the bottom peripheral edge of the flexible body in a fluid tight engagement, and wherein the inner circumferentially extending surface of the flexible body and the generally planar top inner surface of the heat conductive base in combination define an interior volume of the vertically collapsible cooking vessel; and a heatsink structurally interconnected to the generally planar bottom outer surface of the heat conductive base, the heatsink having an annular shaped radiator formed of heat conductive material, and a circumferentially extending shield, the annular shaped radiator having an upper edge portion in frictional contact with the bottom outer surface of the heat conductive base, a bottom edge portion spaced apart from the upper edge portion, an inner circumferentially extending edge portion defining an interior diameter, and an outer circumferentially extending edge portion defining an exterior diameter, and further having a plurality of regularly spaced bends and regularly spaced channels, each of the regular spaced channels extending from the interior diameter to the exterior diameter, and the circumferentially extending shield has an "L" shaped cross-sectional configuration with a generally vertically extending side-wall and a generally perpendicularly extending bottom, the side wall having an upper edge portion, a bottom edge portion, an outer circumferential surface, an inner circumferential surface and a defines a plurality of spacedly arrayed heat releasing through orifices, and the generally perpendicularly extending bottom is carried adjacent the bottom edge portion of the sidewall and extends generally perpendicularly radially inwardly, the perpendicular bottom having an upper surface, and a bottom surface and defines a medial bottom orifice, and the inner circumferential surface of the side wall communicates with the outer circumferential edge portion of the annular shaped radiator at the exterior diameter and the upper edge portion of the sidewall structurally communicates with the outer circumferential surface of the heat conductive base, and the spacedly arrayed heat releasing orifices communicate with the plurality of regularly spaced channels of the annular shaped radiator, and the upper surface of the generally perpendicularly extended bottom of the shield frictionally communicates with the bottom edge portion of the annular shaped radiator so as to protect the plurality of regularly spaced bends and channels, and a diameter of the medial bottom orifice is substantially the same as the inner diameter of the annular shaped radiator.

DETAILED DESCRIPTION OF THE PREFERRED EMBODIMENTS

Figure 1:
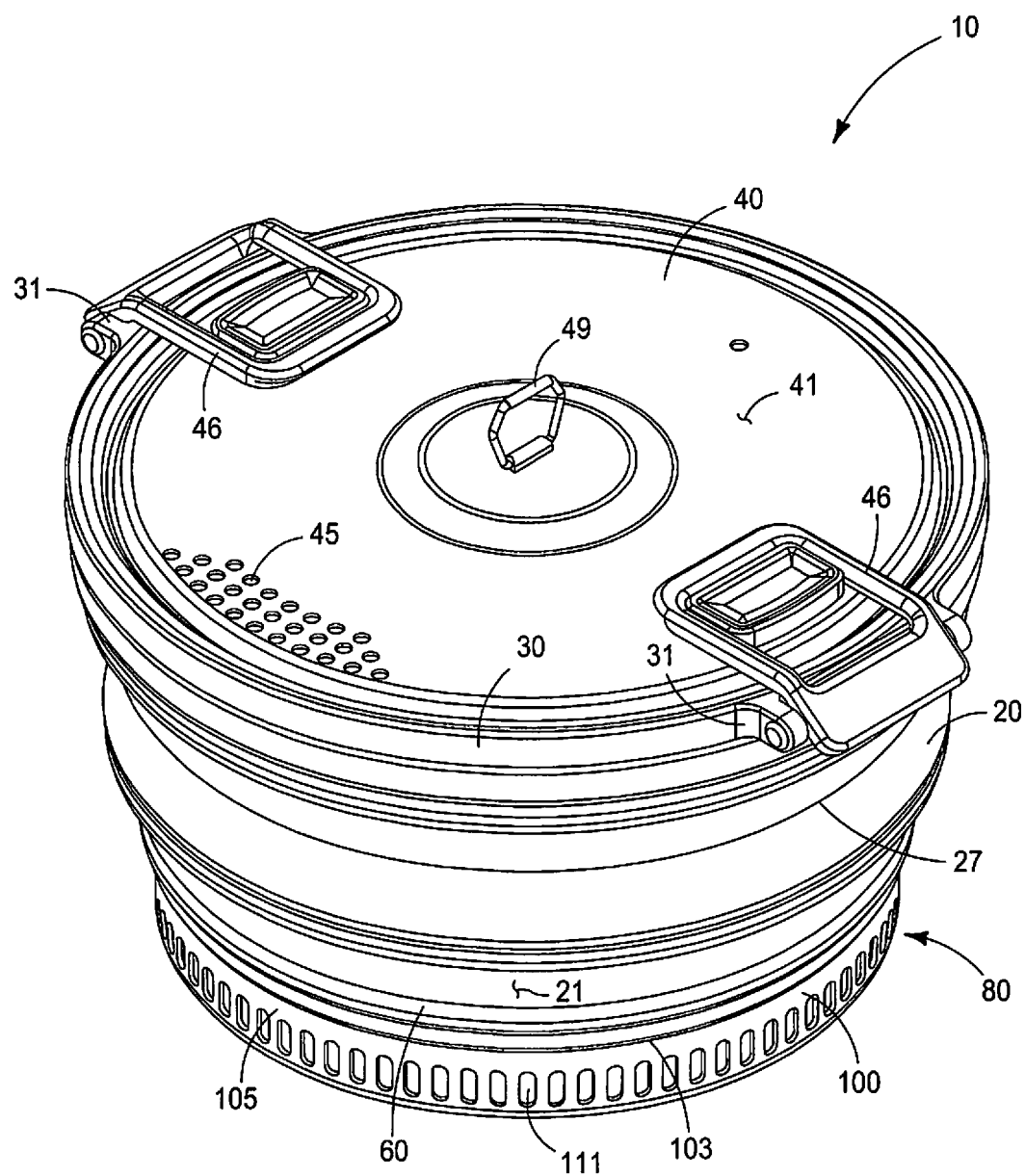
FIG. 1 is an isometric top and side view of the collapsible vessel with heatsink with the removable lid attached thereto.

This disclosure of the invention is submitted in furtherance of the constitutional purposes of the U.S. Patent Laws "to promote the progress of science and useful arts" (Article 1, Section 8).

An axially collapsible cooking vessel is generally indicated by numeral 10 in the Figures, and provides a flexible body 20, a removable lid 40 a heat conductive base 60, and a heatsink 80.

The flexible body 20, as seen in the Figures, has a general configuration of a truncated cone with an outer circumferentially extending surface 21, an opposing inner circumferentially extending surface 22, an upper peripheral edge 23 defining an upper diameter 24, and a bottom edge 25 defining a bottom diameter 26. The body 20 defines an interior volume 28 surrounded by the inner circumferentially surface 22 between the upper peripheral edge 23 and the bottom edge 25, and further has a height dimension 32 extending between the upper peripheral edge 23 and the bottom edge 24. An internal support ring 29 may be integrally carried within the flexible body 20 proximate the upper peripheral edge 23. An annular ring 30 may be carried adjacent the upper peripheral edge 23 extending about the outer circumferential surface 21. The annular ring 30 provides plural spacedly arrayed protuberances 31 to provide for attachment of the removable lid 40. Further, the annular ring 30 may carry handles (not shown) to facilitate handling of the cooking vessel 10.

In the preferred embodiment, the flexible body 20 is formed of a flexible resiliently deformable polymer, such as, but not limited, to silicone, or thermal plastic urethane (TPU) or thermal plastic rubber (TPR). The flexible body 20 defines at least one and preferably plural circumferentially extending areas 27 having a reduced thickness. The reduced thickness areas 27 extend circumferentially about the flexible body 20 and are spacedly arrayed thereon. The reduced thickness areas 27 allow the flexible body 20 to form a flexible internally nestable wall wherein the flexible body 20 folds axially inwardly and downwardly upon itself about the reduced thickness areas 27 to reduce the height dimension 32 (See FIGS. 2 and 3) of the flexible body 20.

The heat conductive base 60 is formed of metal such as, but not limited to aluminum or another metal alloy having a low heat capacity and low specific heat, and is "dish like" in configuration having a generally planar top inner surface 61, and an opposing planar bottom outer surface 62. A circumferentially extending lip 64 extends entirely about the circumference of the heat conductive base 60, extending generally upwardly therefrom and has an outer circumferential surface 66. The lip 64 further has an upper peripheral edge 65 that is spaced apart from, and vertically above the planar top inner surface 61.

The upper peripheral edge 65 of the circumferentially extending lip 64 is interconnected with the bottom edge 25 of the flexible body 20 in a fluid tight engagement. In one preferred embodiment, the bottom edge 25 of the flexible body 20 is formed onto the upper peripheral edge 65 of the heat conductive base 60 during the manufacturing process so as to provide a fluid-tight seal therebetween, but other known attachment means are usable as well. The fluid tight interconnection of the heat conductive base 60 with the flexible body 20 provides for the cooking vessel 10 to be able to hold liquids and further defines the interior volume 28. The outer circumferential surface 66 and the planar bottom outer surface 62 define a bottom heat receiving portion of the cooking vessel 10.

The heatsink 80 is interconnected to the bottom 62 and outer circumferential surface 66 of the heat conductive base 60 and comprises an annular shaped radiator 81 and a circumferentially extending shield 100.

Figure 6:
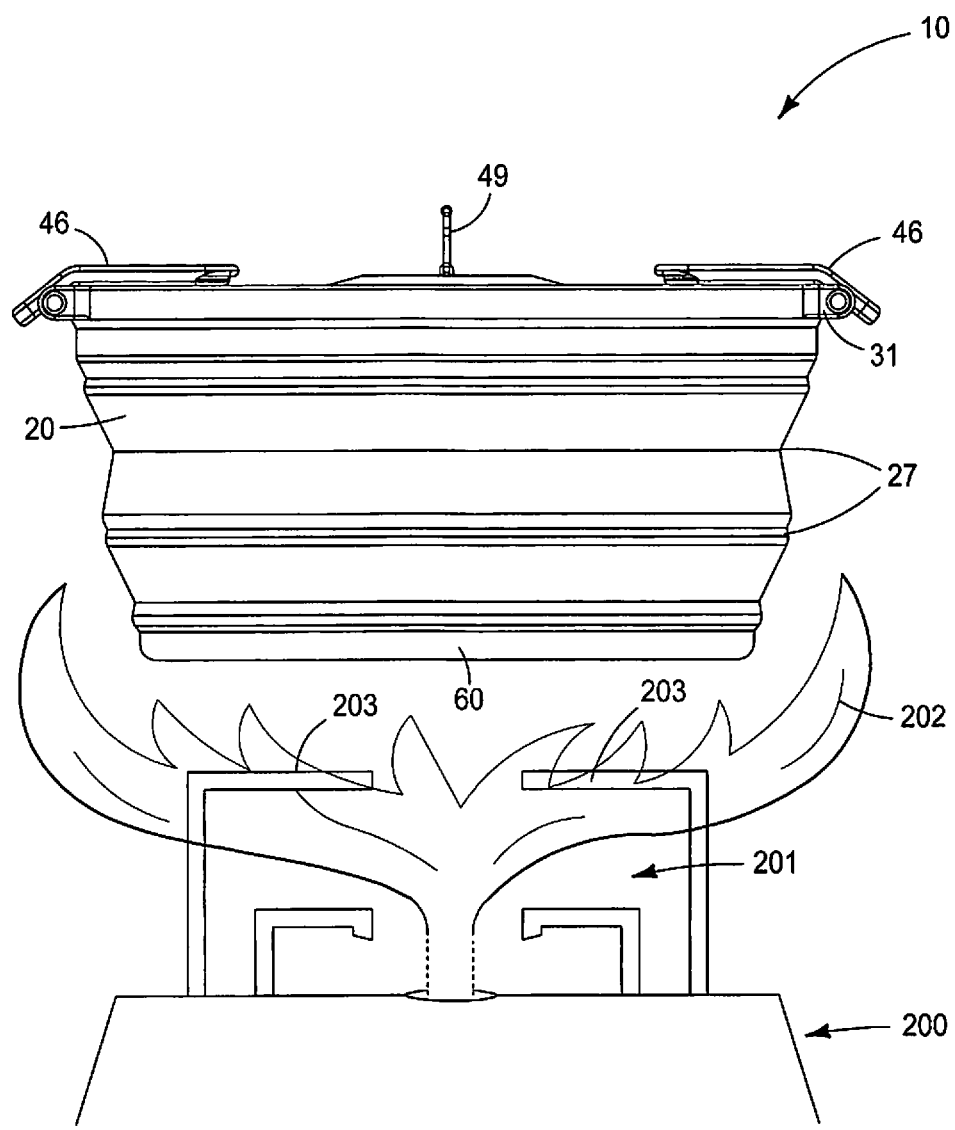
FIG. 6 is an orthographic environmental view of a known cooking vessel adjacent above a camp stove showing how the camp stove flames can extend to and over and about the vessel body and cause deterioration thereof.

The annular shaped radiator 81 has a configuration of an annulus and has an upper edge portion 82, an opposing bottom edge portion 83, an inner circumferentially extending edge portion 84 defining an interior diameter 85, and an outer circumferentially extending edge portion 86 defining an exterior diameter 87. The radiator 81 is formed of heat conductive material, preferably a material having a low heat capacity and a low specific heat, such that when the annular shaped radiator 81 is exposed to a heat source, such as a camp stove 200 having a stove burner 201 emitting a flame 202 (FIGS. 6, 7) the radiator 81 efficiently absorbs the heat energy and passes the heat energy to and through the heat conductive base 60. In one preferred embodiment the annular shaped radiator 81 is formed of aluminum. In additional contemplated embodiments the annular shaped radiator 81 is formed of a metallic alloy.

Figure 5:
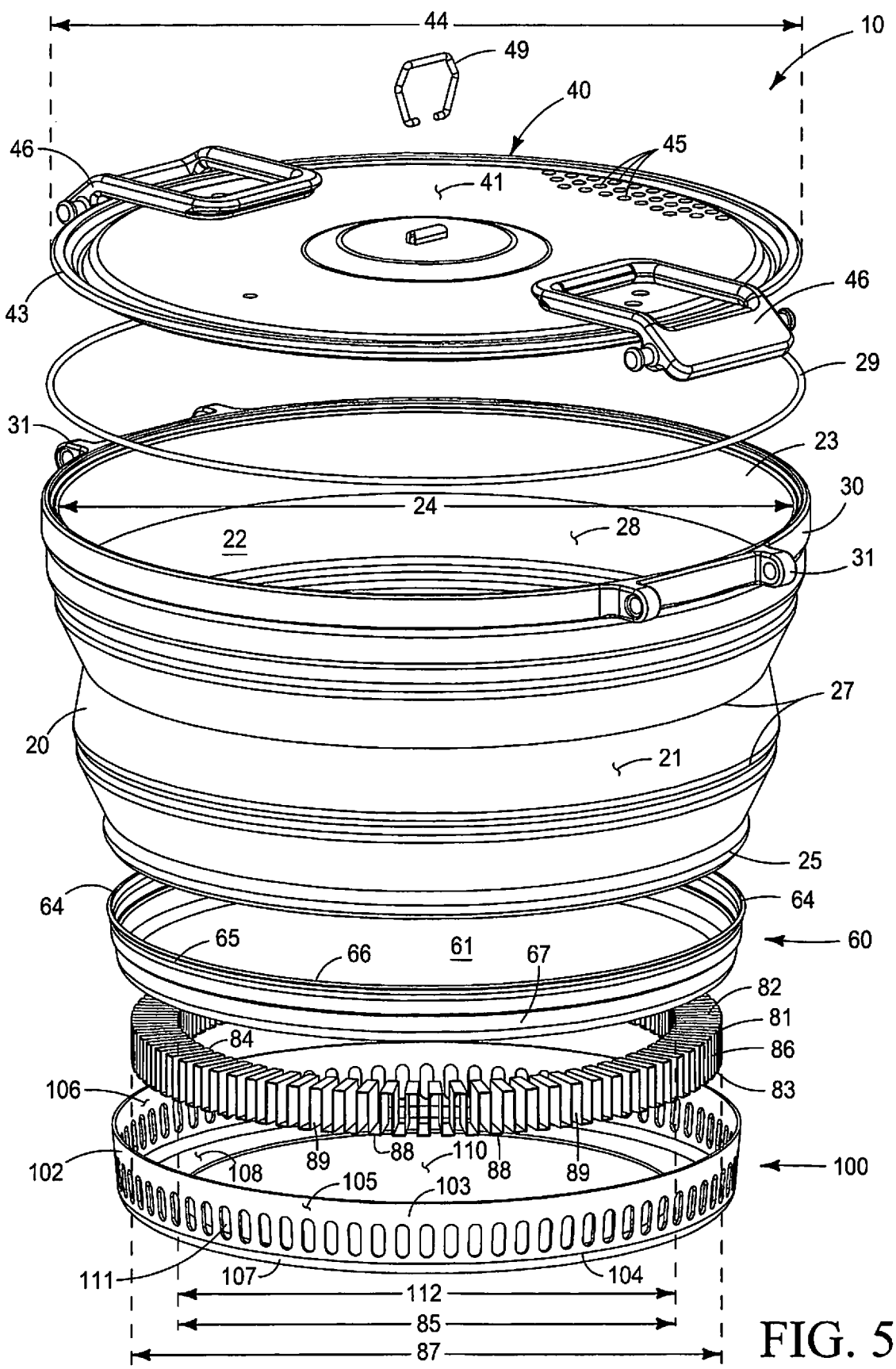
FIG. 5 is a side, perspective, exploded view of the collapsible vessel with heatsink of FIG. 1.

The radiator 81, in a first embodiment, has a plurality of regularly spaced bends 88 and defines a plurality of regularly spaced channels 89. The plurality of regularly spaced bends 88 and regularly spaced channels 89 increases the surface area that is exposed to the heat source, or flame 202 so as to absorb more heat therefrom and pass that heat energy to the heat conductive base 60. As shown in FIG. 5, the regularly spaced bends 88 are at both the upper edge portion 82 and opposing bottom edge portion 83 of the radiator 81, which increases the heat absorbing surface area that is communicated to the heat conductive base 60. The plurality of regularly spaced channels 89 are generally radially oriented relative to a center (not shown) of the radiator 81.

The upper edge portion 82 annular shaped radiator 81 is in direct frictional contact with the planar bottom outer surface 62 of the heat conductive base 60. In one embodiment of the radiator 81 is structurally interconnected to the heat conductive base 60 and in a second embodiment, the radiator 81 is separate from, but maintained in direct frictional contact with the bottom planar surface 62 of the heat conductive base 60.

Figure 4:
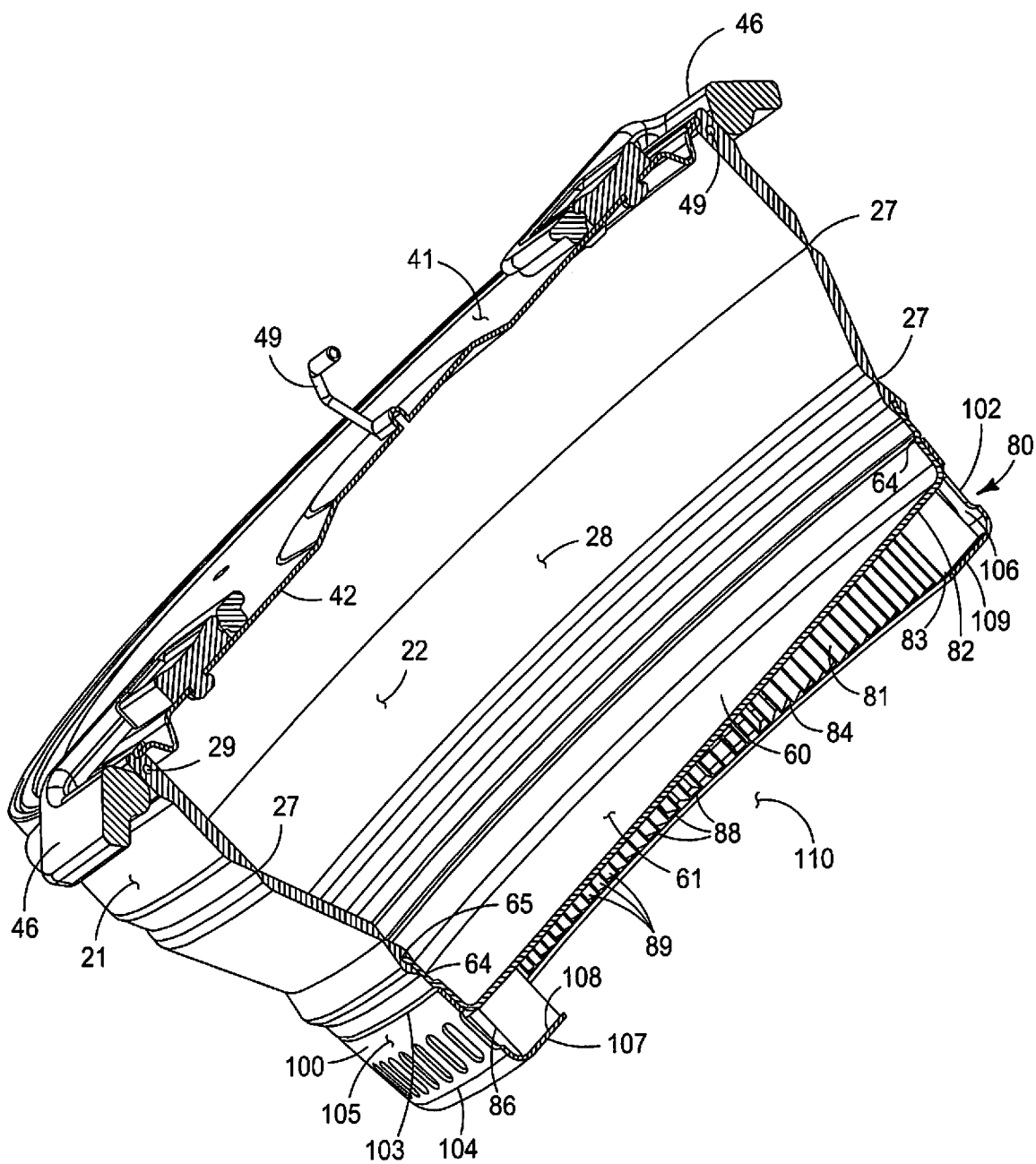
FIG. 4 is an orthographic cross sectional view of the collapsible vessel with heatsink of FIG. 2.
Figure 7:
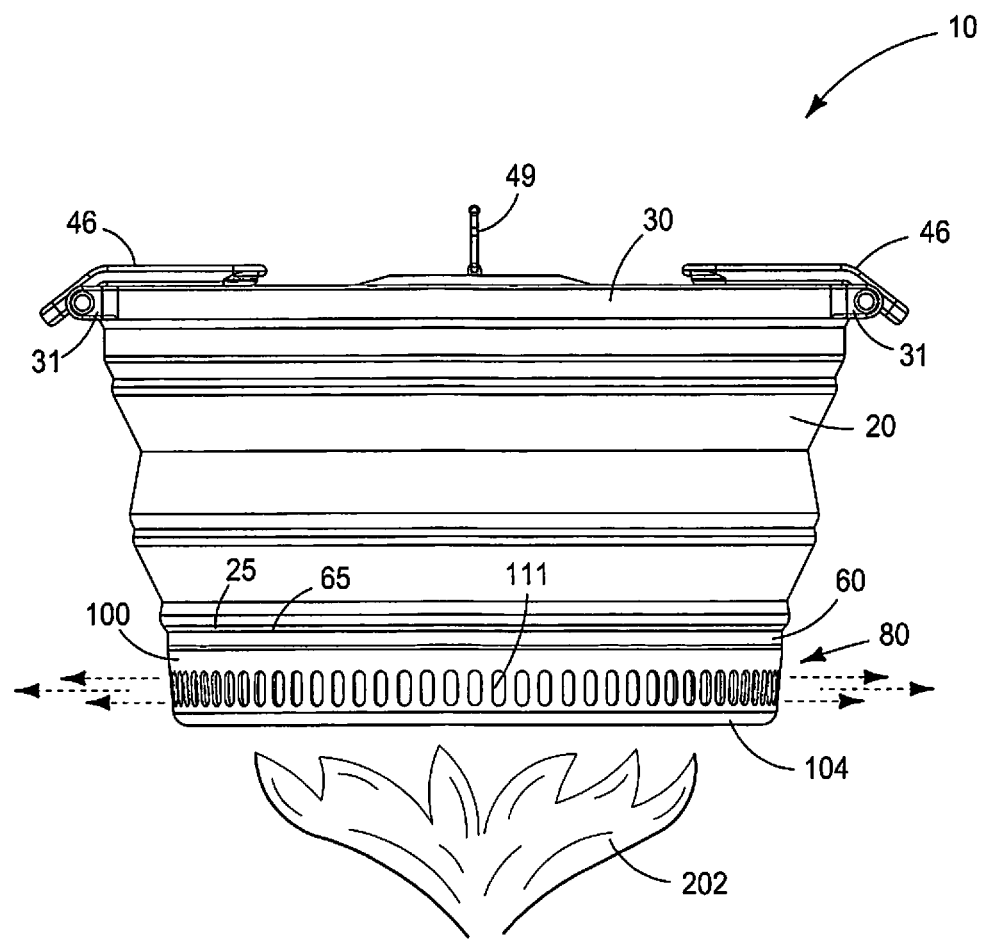
FIG. 7 is an orthographic environmental view, similar to FIG. 6, showing how the heatsink of the instant invention prevents the stove flames from contacting the flexible polymer body.

The circumferentially extending shield 100, has an L-shaped cross-sectional configuration (FIG. 4) with a vertically extending sidewall 102 and an integral perpendicularly extending bottom 107. The vertically extending sidewall 102 has an upper edge portion 103, an opposing bottom edge portion 104, an outer circumferential surface 105 and an inner circumferential surface 106. The vertically extending sidewall 102 further defines a plurality of regularly spaced heat releasing orifices 111 that communicate between the outer circumferential surface 105 and the inner circumferential 106. The heat releasing orifices 111 further communicate with the plurality of regularly spaced channels 89 of the radiator 81, and as shown in FIG. 7, so as to direct the flame 202 generated by the stove 200 radially outwardly from the outer circumferentially extending surface 21 of the flexible body 20, thereby preventing the flame 202 from "lapping" upwardly around and about the flexible body 20. Preventing the flame 202 from contacting the flexible body 20 enhances the longevity and durability of the flexible body 20 and has been shown to prevent heat related deterioration of the flexible body 20. Further, the orifices 111 prevent the heat energy from being completely reflected downwardly onto the stove 200 which might cause risks of explosions or fire, or burns when a user attempts to adjust the stove 200.

The perpendicularly extending bottom 107 has an inner upper surface 108 and an opposing outer bottom surface 109. The outer bottom surface 109 further has a radially inner edge portion 113 that defines a bottom orifice 110. Diameter 112 of the bottom orifice 110 is substantially similar in size to the interior diameter 85 of the annular shaped radiator 81. As shown in FIG. 5, the circumferentially extending shield 100 extends frictionally about and around the outer circumferentially extending edge portion 86 of the radiator and also extends radially inwardly immediately adjacent to the bottom edge portion 83 of the radiator 81. The upper edge portion 103 of the vertically extending sidewall 102 is structurally interconnected with the outer circumferential surface 66 of the heat conductive base 60 so that the heatsink 80 is securely interconnected to the heat conductive base 60 and is integral therewith.

The perpendicularly extending bottom 107 provides structural integrity to the annular shaped radiator 81 and protects the plurality of bends 88 and channels 89 from being unintentionally bent, or otherwise deformed during use, such as when the cooking vessel 10 is placed on pot supports 203 of a camp stove 200, or perhaps in-delicately placed on an irregular surface, such as, but not limited to, the top of a stone/rock/stump. The bottom 107 further increases the heat receiving surface area.

The bottom orifice 110 of the heatsink 80, in combination with a top to bottom thickness (not shown) of the annular shaped radiator 81, further provides a "recess" into which the stove burner 201 may be placed during use. Placement of the stove burner 201 into the "recess" reduces the amount of wind and undesirable airflow between the flame 202 and the heat conductive base 60 and has the tendency to prevent the stove 200 from "going out" unintentionally, which is a common occurrence when camp stoves 200 are used in unprotected windy conditions. Further still, placement of a stove burner 201 within the "recess" has the tendency to prevent the vessel 10 from unintentionally sliding off the stove 201 and pot supports 203.

Testing has shown that the heatsink 80 of the instant invention materially improves performance of the cooking vessel 10 by increasing the efficiency of the cooking vessel 10. This material improvement in performance and efficiency is believed to be a result of increased surface area being exposed to the heat source from 202 and the transfer of that heat energy to, and through, the heat conductive base 60, and thereupon to the food items (not shown) within the interior volume 28. Testing has shown that 0.200 liters (200 grams) of water placed in the instant inventive collapsible cooking vessel with heatsink 10, and the same amount of water placed in four similarly sized/dimensioned cooking vessels (but without a heatsink) and placed on similar camp stoves 200 adjusted to produce similar amounts of heat, resulted in the water within the instant collapsible vessel with heatsink 10 boiling in 2.00 minutes, and the boiling water was evenly distributed across the upper surface 61 heat conductive base 60. The water in the four comparison vessels, on the other hand, took approximately 2.50 minutes to boil, and the boiling only occurred in the center region of the pot bottom.

The removable lid 40, as shown in the Figures, has a top surface 41, a bottom surface 42 and defines a circumferential edge 43 with a diameter 44. In one preferred embodiment, the removable lid 40 defines a plurality of spacedly arrayed drain holes 45 therein. The plurality of drain holes 45 communicate between the top surface 41 and the bottom surface 42 and provide a means for a user to drain liquid from the interior volume 28 without risking loss of the desirable food products (not shown). The removable lid 40, further has a lid latch 46, a handle 49, lid latch protuberances 48 and lid thumb pads 47 which are useful when the vessel 10 is inverted such as to drain fluid through the plurality of drain holes 45 while retaining desirable food products within the interior volume 28. The diameter 44 of the removable lid 40 is such that the circumferential edge 43 of the removable lid 40 engages with the upper peripheral edge 43 of the flexible body 20, and the lid latch protuberances 48 releasably engage with the lid securing protuberances 31 carried by the annular ring 30.

Operation

Having described the structure of our collapsible vessel with heatsink its operation may be understood.

Figure 2:
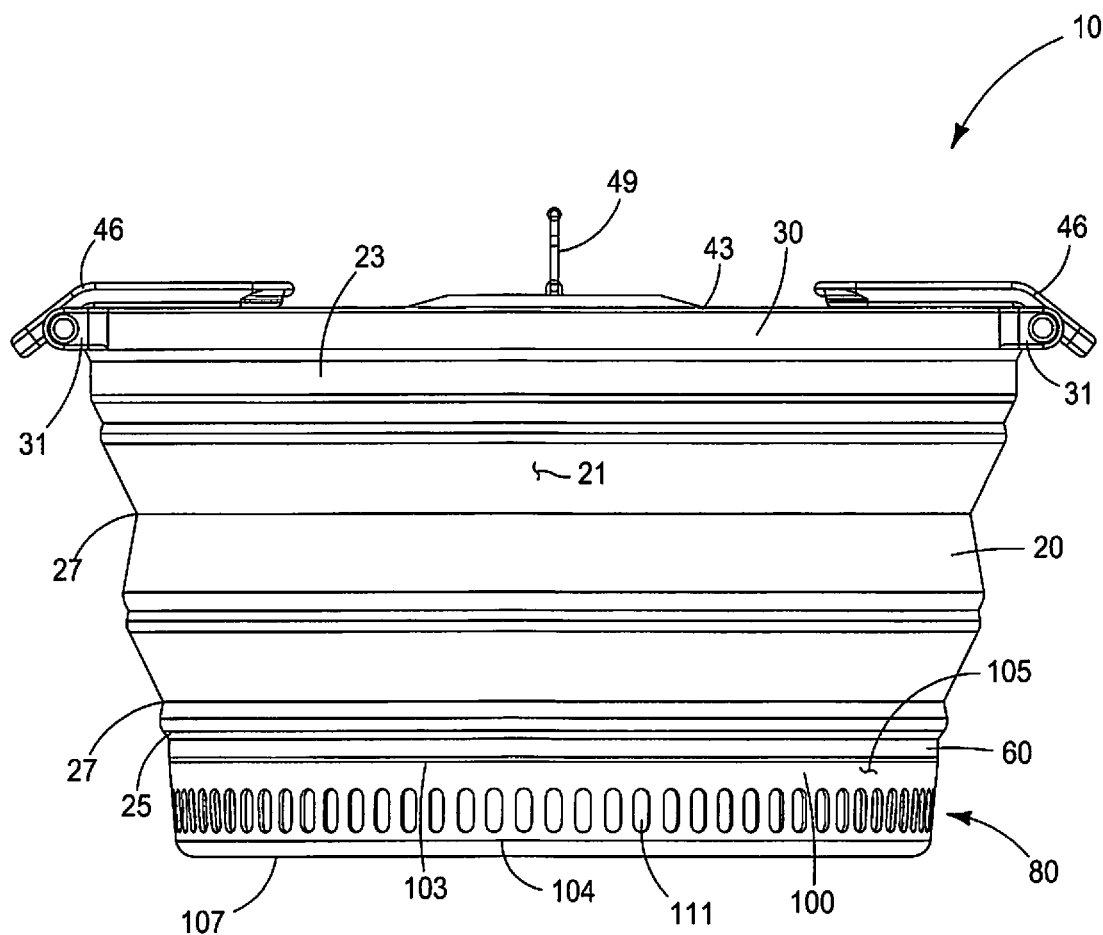
FIG. 2 is an orthographic side view of the collapsible vessel with heatsink of FIG. 1.
Figure 3:
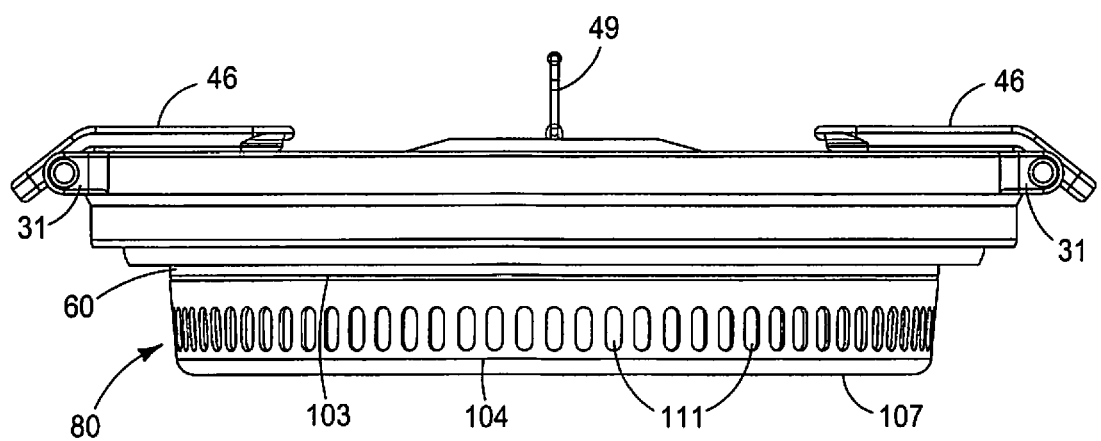
FIG. 3 is an orthographic side view of the collapsible vessel with heatsink of FIG. 2, shown in a collapsed/storage/transport configuration.

Assuming the collapsible cooking vessel with heatsink 10 is in its collapsed/transport configuration (FIG. 3) a user would detach the removable lid 40 by disengaging the latches 46, and would then exert an axial downward force directly on the generally planar top inner surface 61 of the heat conductive base 60, while "holding onto" the upper peripheral edge 21 of the flexible body 20. The axial downward pressure will cause the flexible body 20 and the "nested" portions thereof that have folded inwardly at and about the reduced thickness areas 27 to "unfold" and extend such that the flexible body 20 returns to an extended/use configuration. (FIG. 2). The instant collapsible vessel with heatsink 10 is thereafter used like any other cooking vessel. When use of the vessel 10 is complete, the above process is repeated in reverse to collapse the vessel 10 into its storage/transport configuration. (FIG. 3).

A collapsible cooking vessel 10 comprising a flexible body 20 having an outer circumferentially extending surface 21, an opposing inner circumferentially extending surface 22, an upper peripheral edge 23 defining an upper diameter 24, an opposing and spaced apart bottom edge 25 defining a bottom diameter 26, and plural circumferentially extending reduced thickness areas 27 in the flexible body 20 spacedly arrayed between the upper peripheral edge 23 and the bottom edge 25; a heat conductive base 60 having a generally planar top surface 61, an opposing generally planar bottom surface 62 and an upwardly extending circumferential lip 64 extending entirely about a circumference 63 of the heat conductive base 60 and wherein the upwardly extending lip 64 has an upper peripheral edge 65 that is interconnected with the bottom edge 25 of the flexible body 20 in a fluid tight engagement, and wherein the inner circumferentially extending surface 22 of the flexible body 20 and the generally planar top surface 61 of the heat conductive base 60 define an interior volume 28 of the collapsible cooking vessel 10; a heatsink 80 structurally interconnected to the generally planar bottom surface 62 of the heat conductive base 60, the heatsink 80 having an annular shaped radiator 81 and a circumferentially extending shield 100, the annular shaped radiator 81 having an upper edge portion 82 in contact with the bottom surface 62 of the heat conductive base 60, an opposing bottom edge portion 83, an inner circumferential edge 84 defining an interior diameter 85, and an outer circumferential edge portion 86 defining an exterior diameter 87, and further having a plurality of regularly spaced bends 88 and regularly spaced channels 89, and the circumferentially extending shield 100 has a side-wall 102 and a generally perpendicularly extending bottom 107, the side wall 102 having an upper edge portion 103, a bottom edge portion 104, an outer surface 105, an inner surface 106 and defines a plurality of spacedly arrayed heat releasing orifices 111 communicating through the side wall 102 between the upper edge portion 103 and the bottom edge portion 104, and the upper edge portion 103 of the side wall 102 structurally communicates with the circumferential upwardly extending the lip 64 of the heat conductive base 60, and the perpendicularly extending bottom 107 is adjacent the bottom edge portion 104 of the side wall 102 and extends generally radially inwardly therefrom and defines a medial bottom orifice 110; and an annular ring 30 extending circumferentially about the flexible body 20 proximate the upper peripheral edge 23, the annular ring 30 carrying a handle.

A vertically collapsible cooking vessel further comprising: plural spacedly arrayed lid securing protuberances 31 adjacent the upper peripheral edge 23 and adjacent the outer circumferentially extending surface 21 of the flexible body 20.

A vertically collapsible cooking vessel further comprising: a removable lid 40 having a top surface 41, a bottom surface 42, a circumferentially extending peripheral edge 43 having a diameter 44 that is substantially similar to the upper diameter 24 of the flexible body 20; and a lid handle 49.

A vertically collapsible cooking vessel further comprising: a plurality of drain holes 45 defined in the removable lid 40, the plurality of drain holes 45 communicating between the top surface 41 and the bottom surface 42.

A vertically collapsible cooking vessel further comprising: a latch 46 carried by the releasable lid 40 that releasable engages with the annular ring 30 adjacent the upper peripheral edge 23 of the flexible body 20.

A vertically collapsible cooking vessel wherein the flexible body 20 has two spacedly arrayed circumferentially extending reduced thickness areas 27.

A vertically collapsible cooking vessel wherein the flexible body 20 has three spacedly arrayed circumferentially extending reduced thickness areas 27.

A vertically collapsible cooking vessel wherein the flexible body 20 has one spacedly arrayed circumferentially extending reduced thickness area 27.

A vertically collapsible cooking vessel wherein the flexible body 20 is axially collapsible by folding the spacedly arrayed circumferentially extending reduced thickness areas 27 upon themselves to reduce the vertical height of the vessel 10 for storage and transport.

A vertically collapsible cooking vessel wherein the flexible body 20 has a configuration of a truncated cone.

A vertically collapsible cooking vessel wherein the body 20 is formed of silicone.

A vertically collapsible cooking vessel wherein the body 20 is formed of a flexible polymer.

A vertically collapsible cooking vessel wherein the body 20 is formed of Thermal Plastic Urethane (TPU).

A vertically collapsible cooking vessel 10 comprising: a flexible polymer body 20 having an outer circumferentially extending surface 21, an opposing inner circumferentially extending surface 22, an upper peripheral edge 23 defining an upper diameter 24, an opposing and spaced apart bottom edge 25 defining a bottom diameter 26, and plural circumferentially extending reduced thickness areas 27 in the body 20 spacedly arrayed between the upper peripheral edge 23 and the bottom edge 25; a heat conductive base 60 having a generally planar top inner surface 61, an opposing generally planar bottom outer surface 62 and a circumferential upwardly extending the lip 64 extending entirely about a circumference 63 of the heat conductive base 60 and wherein the circumferential upwardly extending lip 64 has an upper peripheral edge 65 that is interconnected with the bottom edge of the body 25 in a fluid tight engagement, and wherein the inner circumferentially extending surface 22 of the body 20 and the generally planar top inner surface 61 of the heat conductive base 60 in combination define an interior volume 28 of the vertically collapsible cooking vessel 10; and a heatsink 80 structurally interconnected to the generally planar bottom outer surface 62 of the heat conductive base 60, the heatsink 80 having an annular shaped radiator 81 formed of heat conductive material, and a circumferentially extending shield 100, the annular shaped radiator 81 having an upper edge portion 82 in frictional contact with the bottom outer surface 62 of the heat conductive base 60, a bottom edge portion 83 spaced apart from the upper edge portion 82, an inner circumferentially extending edge portion 84 defining an interior diameter 85, and an outer circumferentially extending edge portion 86 defining an exterior diameter 87, and further having a plurality of regularly spaced bends 88 and regularly spaced channels 89, each of the regular spaced channels 89 extending radially from the interior diameter 85 to the exterior diameter 87, and the circumferentially extending shield 100 has an "L" shaped cross-sectional configuration 101 with a generally vertically extending side-wall 102 and a generally perpendicularly extending bottom 107, the side wall 102 having an upper edge portion 103, a bottom edge portion 104, an outer circumferential surface 105, an inner circumferential surface 106 and a defines a plurality of spacedly arrayed heat releasing through orifices 111, and the perpendicularly extending bottom 107 is adjacent the bottom edge portion 104 of the sidewall 102 and extends generally perpendicularly radially inwardly therefrom, the perpendicular bottom 107 having an upper surface 108, and a bottom surface 109 and defines a medial bottom orifice 110, and the inner circumferential surface 106 of the side wall 102 communicates with the outer circumferential edge portion 86 of the annular shaped radiator 81 at the exterior diameter 87 and the upper edge portion 103 of the sidewall 102 structurally communicates with the circumferential upwardly extending lip 64 of the heat conductive base 60, and the spacedly arrayed heat releasing orifices 111 communicate with the plurality of regularly spaced channels 89 of the annular shaped radiator 81, and the upper surface 108 of the perpendicularly extending bottom 107 communicates with the bottom edge portion 83 of the annular shaped radiator 81 so as to protect the plurality of regularly spaced bends 88 and channels 89, and a diameter 112 of the medial bottom orifice 110 is substantially the same as the interior diameter 85 of the annular shaped radiator 81.

We claim:
1. A collapsible cooking vessel comprising:
a flexible body having an outer circumferentially extending surface, an opposing inner circumferentially extending surface, an upper peripheral edge defining an upper diameter, an opposing and spaced apart bottom edge defining a bottom diameter, and plural circumferentially extending reduced thickness areas in the flexible body spacedly arrayed between the upper peripheral edge and the bottom edge;
a heat conductive base having a generally planar top surface, an opposing generally planar bottom surface and an upwardly extending circumferential lip extending entirely about a circumference of the heat conductive base and wherein the upwardly extending lip has an upper peripheral edge that is interconnected with the bottom peripheral edge of the flexible body in a fluid tight engagement, and wherein the inner circumferentially extending surface of the flexible body and the generally planar top surface of the heat conductive base define an interior volume of the collapsible cooking vessel;
a heatsink structurally interconnected to the generally planar bottom surface of the heat conductive base, the heatsink having an annular shaped radiator and a circumferentially extending shield,
the annular shaped radiator having an upper edge portion in contact with the bottom surface of the heat conductive base, an opposing bottom edge portion, an inner circumferential edge defining an interior diameter, and an outer circumferential edge portion defining an exterior diameter, and further having a plurality of regularly spaced bends and regularly spaced channels, and the circumferentially extending shield has a side-wall and a generally perpendicularly extending bottom, the side wall having an upper edge portion, a bottom edge portion, an outer surface, an inner surface and defines a plurality of spacedly arrayed heat releasing orifices communicating through the side wall between the upper edge portion and the bottom edge portion, and the upper edge portion of the side wall structurally communicates with the circumferential upwardly extending the lip of the heat conductive base, and the perpendicularly extending bottom is adjacent the bottom edge portion of the side wall and extends inwardly therefrom and defines a medial bottom orifice; and an annular ring extending circumferentially about the flexible body proximate the upper peripheral edge, the annular ring carrying a handle.

2. The vertically collapsible cooking vessel of claim 1 and further comprising:
plural spacedly arrayed lid securing protuberances adjacent the upper peripheral edge and adjacent the outer circumferentially extending surface of the flexible body.

3. The vertically collapsible cooking vessel of claim 1 and further comprising:
a removable lid having a top surface, an opposing bottom surface, a circumferentially extending peripheral edge having a diameter that is substantially similar to the upper diameter of the flexible body; and
a lid handle.

4. The vertically collapsible cooking vessel of claim 3 and further comprising:
a plurality of drain holes defined in the removable lid, the plurality of drain holes communicating between the top surface and the opposing bottom surface.

5. The vertically collapsible cooking vessel of claim 3 and further comprising:
a latch carried by the releasable lid that releasable engages with the annular ring adjacent the upper peripheral edge of the flexible body.

6. The vertically collapsible cooking vessel of claim 1 and wherein the flexible body has one circumferentially extending reduced thickness area.

7. The vertically collapsible cooking vessel of claim 1 and wherein the flexible body has two spacedly arrayed circumferentially extending reduced thickness areas.

8. The vertically collapsible cooking vessel of claim 1 and wherein the flexible body has plural spacedly arrayed circumferentially extending reduced thickness areas.

9. The vertically collapsible cooking vessel of claim 1 and wherein the flexible body is axially collapsible by folding the circumferentially extending reduced thickness areas upon themselves to reduce a height dimension of the vessel for storage.

10. The vertically collapsible cooking vessel of claim 1 and wherein the flexible body has a configuration of a truncated cone.

11. The vertically collapsible cooking vessel of claim 1 and wherein the flexible body is formed of silicone.

12. The vertically collapsible cooking vessel of claim 1 and wherein the body is formed of a flexible polymer.

13. The vertically collapsible cooking vessel of claim 1 and wherein the body is formed of Thermal Plastic Urethane (TPU).

14. A vertically collapsible cooking vessel comprising:
a flexible polymer body having an outer circumferentially extending surface, an opposing inner circumferentially extending surface, an upper peripheral edge defining an upper diameter, an opposing and spaced apart bottom edge defining a bottom diameter, and plural circumferentially extending reduced thickness areas in the silicone body spacedly arrayed between the upper peripheral edge and the bottom edge;

a heat conductive base having a generally planar top inner surface, an opposing generally planar bottom outer surface and a circumferential upwardly extending the lip extending entirely about a circumference of the heat conductive base and wherein the circumferential upwardly extending lip has an upper peripheral edge that is interconnected with the bottom peripheral edge of the body in a fluid tight engagement, and wherein the inner circumferentially extending surface of the body and the generally planar top inner surface of the heat conductive base in combination define an interior volume of the vertically collapsible cooking vessel; and a heatsink structurally interconnected to the generally planar bottom outer surface of the heat conductive base, the heatsink having an annular shaped radiator formed of heat conductive material, and a circumferentially extending shield, the annular shaped radiator having an upper edge portion in frictional contact with the bottom outer surface of the heat conductive base, a bottom edge portion spaced apart from the upper edge portion, an inner circumferentially extending edge portion defining an interior diameter, and an outer circumferentially extending edge portion defining an exterior diameter, and further having a plurality of regularly spaced bends and regularly spaced channels, each of the regular spaced channels extending from the interior diameter to the exterior diameter, and the circumferentially extending shield has an "L" shaped cross-sectional configuration with a generally vertically extending side-wall and a generally perpendicularly extending bottom, the side wall having an upper edge portion, a bottom edge portion, an outer circumferential surface, an inner circumferential surface and a defines a plurality of spacedly arrayed heat releasing through orifices, and the bottom is carried adjacent the bottom edge portion of the sidewall and extends generally perpendicularly radially inwardly, the perpendicular bottom having an upper surface, and a bottom surface and defines a medial bottom orifice, and the inner circumferential surface of the side wall communicates with the outer circumferential edge portion of the annular shaped radiator at the exterior diameter and the upper edge portion of the sidewall structurally communicates with the circumferential upwardly extending lip of the heat conductive base, and the spacedly arrayed heat releasing orifices communicate with the plurality of regularly spaced channels of the annular shaped radiator, and the upper surface of the bottom communicates with the bottom edge portion of the annular shaped radiator so as to protect the plurality of regularly spaced bends and channels, and a diameter of the medial bottom orifice is substantially the same as the inner diameter of the annular shaped radiator.

* * * * *